United States Patent
Sato et al.

(10) Patent No.: US 10,670,486 B1
(45) Date of Patent: Jun. 2, 2020

(54) PRESSURE MEASUREMENT SYSTEM FOR JUDGING POWER SUPPLY FROM TERMINAL DEVICE TO CONTROL SECTION

(71) Applicant: ULVAC, INC., Kanagawa (JP)

(72) Inventors: Takanobu Sato, Kanagawa (JP);
Toyoaki Nakajima, Kanagawa (JP);
Takeshi Miyashita, Kanagawa (JP);
Masahiro Fukuhara, Kanagawa (JP);
Hideki Yoshizawa, Kanagawa (JP)

(73) Assignee: ULVAC, INC., Kanagawa (JP)

( * ) Notice: Subject to any disclaimer, the term of this patent is extended or adjusted under 35 U.S.C. 154(b) by 0 days.

(21) Appl. No.: 16/710,252

(22) Filed: Dec. 11, 2019

(30) Foreign Application Priority Data

Dec. 12, 2018 (JP) .................................. 2018-232957

(51) Int. Cl.
*G01L 21/12* (2006.01)

(52) U.S. Cl.
CPC .................................... *G01L 21/12* (2013.01)

(58) Field of Classification Search
USPC .................................................. 73/700–756
See application file for complete search history.

(56) References Cited

U.S. PATENT DOCUMENTS

| | | | | |
|---|---|---|---|---|
| 2012/0118060 A1* | 5/2012 | Kimura | ................. | G01L 9/0019 73/384 |
| 2015/0276536 A1* | 10/2015 | Gu | ......................... | G01L 21/10 73/755 |
| 2015/0377732 A1* | 12/2015 | Minami | ................. | G01L 21/12 73/31.04 |
| 2018/0266911 A1* | 9/2018 | Collins | ................. | G01L 19/083 |
| 2019/0346328 A1* | 11/2019 | Brucker | ................... | F26B 5/06 |

FOREIGN PATENT DOCUMENTS

| JP | 2007-012019 A | 1/2007 |
|---|---|---|
| JP | 2012-026995 A | 2/2012 |

* cited by examiner

*Primary Examiner* — Andre J Allen
(74) *Attorney, Agent, or Firm* — Cermak Nakajima & McGowan LLP; Tomoko Nakajima

(57) ABSTRACT

Pressure measurement system has inside a main body to be mounted on an object to be measured: a sensor section; a control section processing an input from the sensor section and outputting a predetermined signal; a vacuum gauge provided with power supply circuit sections for providing the control section and the sensor section with power; and a terminal device being connectable to the control section, through a communication line, in a manner to be freely communicated with each other and being capable of supplying the power circuit section with power. The vacuum gauge is arranged to be able to judge the power supply from the terminal device to the control section. When power is supplied from the terminal device to the control section, the control section and the terminal device are connected together through the communication line so as to be freely communicated with each other.

7 Claims, 3 Drawing Sheets

PRESSURE MEASUREMENT SYSTEM FOR JUDGING POWER SUPPLY FROM TERMINAL DEVICE TO CONTROL SECTION

This application claims priority under 35 U.S.C. § 119 to Japanese Patent Application No. 2018-232957, filed Dec. 12, 2018, which is incorporated by reference.

TECHNICAL FIELD

The present invention relates to a pressure measurement system having a vacuum gauge with a main body to be mounted on an object to be measured, the vacuum gauge measuring the pressure inside the object to be measured.

In an apparatus and instruments utilizing vacuum, various kinds of vacuum gauges of different measurement principles have so far been utilized depending on the pressure regions and utilization environment in order to measure the pressure (vacuum) that is lower than atmospheric pressure. A description will be made of an example of a Pirani vacuum gauge (hereinafter simply referred to as a Pirani gauge) which is utilized in a vacuum processing apparatus in which predetermined vacuum processing is performed on a substrate to be processed such as silicon wafer, glass substrate, and the like. The Pirani gauge is provided with a main body that can be freely mounted on a vacuum chamber of a vacuum processing apparatus as an object to be measured. Inside this main body there are provided: a sensor section which is worked by receiving electric power supply ("electric power" is hereinafter simply referred to as "power"); a control section which controls the operation of the sensor section, and which also outputs a predetermined signal by processing the input from the sensor section; and a power source circuit section which, upon receipt of power supply from an external power supply, supplies the control section and the sensor section with power (see JP-A-2012-26995). Among these Pirani gauges, there are ones in which setting values (set points) can be kept in memory, the setting values being to determine the working of movable parts which constitute the vacuum processing apparatus, such as high-vacuum evacuation pumps, gas flow adjustment valves, and gate valves. They are so arranged that, depending on the inputs and setting values from the sensor section, specific signals are outputted to the control unit and the like of the apparatus main body of the vacuum processing apparatus. This kind of setting values are generally so arranged as to be modified appropriately with setting buttons, potentiometers, and the like that are disposed in the main body of the Pirani gauge.

The above-mentioned vacuum gauges are ordinarily operated by receiving power supply (e.g., DC 24V) from the apparatus main body. Therefore, since vacuum gauge has not been provided with power supply from the apparatus main body at the time of assembling and installation of the vacuum processing apparatus, there is a problem in that nothing, e.g., of the work of setting/changing and the like of the setting values (set points) can be done with the vacuum gauges. On the other hand, even in case the setting values (set points) are set or changed after having received the power supply from the apparatus main body, it sometimes becomes necessary within a narrow working space of the vacuum processing apparatus to manipulate the potentiometers and the like while looking at the change in the outputs of the sensor section, thereby taking much time in carrying out the work. Moreover, in case the vacuum gauges will have to be replaced for new ones due to mechanical problems, it is necessary to transfer (or set) the existing setting values to the new vacuum gauges. Furthermore, in performing the setting/changing of the setting values (set points) in the above-mentioned manner, there is a problem in that human errors are likely to occur.

PRIOR ART DOCUMENTS

Patent Documents

Patent Document 1: JP-A-2012-26995

SUMMARY

Problems that the Invention is to Solve

This invention has been made in view of the above points, and has a problem of providing a pressure measurement system which is arranged to facilitate the setting/changing of the setting values.

Means of Solving the Problems

In order to solve the above problems, this invention is a pressure measurement system comprising a vacuum gauge and a terminal device. The vacuum gauge includes, inside a main body to be mounted on an object to be measured: a sensor section worked by receiving power supply; a control section controlling the working of the sensor section and also processing an input from the sensor section and outputting a predetermined signal; and a power circuit section supplying the control section and the sensor section with power. The terminal device is connectable to the control section through a communication line in a manner to be freely communicated with the control section, and is also capable of supplying the power circuit section with power in one of a wired manner and a wireless manner. The vacuum gauge is arranged: to judge the power supply from the terminal device to the control section; and, when power is supplied from the terminal device to the control section, to connect the control section of the vacuum gauge and the terminal device through the communication line in a manner to be freely communicated with each other.

In this invention, preferably the terminal device supplies the power circuit section with power in one of a wired manner and a wireless manner even in a state in which power supply from an outside is not being received so that manipulation information can be transmitted through the communication line to the control section of the vacuum gauge and, at a time of pressure measurement when mounted on the object to be measured, the control section outputs a specific signal depending on the transmitted manipulation information, the input from the sensor section, and setting values. In this case, preferably the terminal device is capable of storing in memory the manipulation information as transmitted to the control section of the vacuum gauge, and this stored manipulation information is capable of being transmitted to the control sections of other vacuum gauges. Further, an arrangement may be made that the manipulation information includes one for performing atmospheric pressure adjustment and zero adjustment and that, when the vacuum gauge has received the transmission of the manipulation information to perform the atmospheric pressure adjustment and zero adjustment, atmospheric pressure adjustment and zero adjustment are performed prior to the pressure measurement upon mounting of the vacuum gauge on the object to be measured.

Further, in this invention, an arrangement is made that the control section is capable of connection of an external memory, and that the external memory is capable of storing the manipulation information as stored in the control section. Still furthermore, the terminal device comprises announcing means announcing the operation information, upon receipt from the control section of the vacuum gauge of the operation information of the vacuum gauge in a state in which the terminal device and the vacuum gauge are communicated with each other. At this time, the operation information preferably includes a value transmitted from a host control apparatus.

According to the above, by providing, e.g., the main body of the vacuum gauge with a USB port so that the vacuum gauge is connected, through a USB cable, to a terminal device such as a smartphone, a tablet, a personal computer, and the like, owned by the user of the vacuum gauge, power can be supplied from the terminal device other than the external power source to at least the control section of the vacuum gauge. Therefore, in case the vacuum gauge is utilized in the vacuum processing apparatus, without waiting for the power supply (e.g., DC 24V) from the apparatus main body, the power can be supplied from the terminal device (generally, DC 5V) so that the activities can be performed such as setting/changing of setting values (set points), measuring sensitivity, kind of gases (nitrogen, oxygen, atmosphere, and the like) to be measured. Furthermore, once the power is supplied from the terminal device to the control section of the vacuum gauge, the terminal device is connected to the control section through the communication line in a manner to be freely communicated. Therefore, the above-mentioned activities can also be performed through the manipulation from the terminal device. This arrangement advantageously contributes to the shortening of the startup time of the vacuum processing apparatus. Further, after having received power supply from the apparatus main body, the output changes of the sensor section to the terminal device is transmitted to the terminal device as the operation information, or the operation information is displayed or speech-outputted with the display and the loudspeaker owned by the terminal device serving as the announcing means. Then, the activities of setting/changing and the like of the setting values (set points) can advantageously be simplified. In this case, if the setting values once set are stored in memory in the terminal device, when the existing setting values are thereafter transferred to a new vacuum gauge after the existing vacuum gauge has been replaced for a new one (another vacuum gauge) due to a mechanical failure with the existing one, the terminal device and the vacuum gauge are connected with each other in a manner to be freely communicated with each other. Then, the setting values that have been stored in memory in the terminal device may only be transmitted so that the occurrence of human errors can be minimized.

Further, the operation information such as the pressure (vacuum degree) inside the object to be processed depending on the output of the sensor section, the time of use (service time) of the sensor section, estimated lifetime of the sensor section, and the like is transmitted to the terminal device, and the announcing means announces the information. As a result, the display for indicating, e.g., the pressure value can be omitted from disposing on the vacuum gauge main body or on the controller, thereby reducing the cost. By the way, in the conventional vacuum gauge, the sensor section (measurement element) used to be taken out of the main body to judge whether there is a mechanical failure or not. But if, e.g., the filament current (or voltage) or indicated pressure is obtained as the operation information, judgment of the presence or absence of mechanical failure in the sensor section can be simply made by comparing the obtained information and the empirical information obtained in advance.

BRIEF DESCRIPTION OF THE DRAWINGS

FIG. 2($b$) is a block diagram of the inner constitution.

MODES FOR CARRYING OUT THE INVENTION

With reference to the figures, a description will now be made of an embodiment of pressure measurement system MS by citing an example in which the object to be processed is a vacuum chamber Vc of a vacuum processing apparatus, and the vacuum gauge to be mounted on this vacuum chamber Vc is a Pirani gauge PG.

Figure 1:
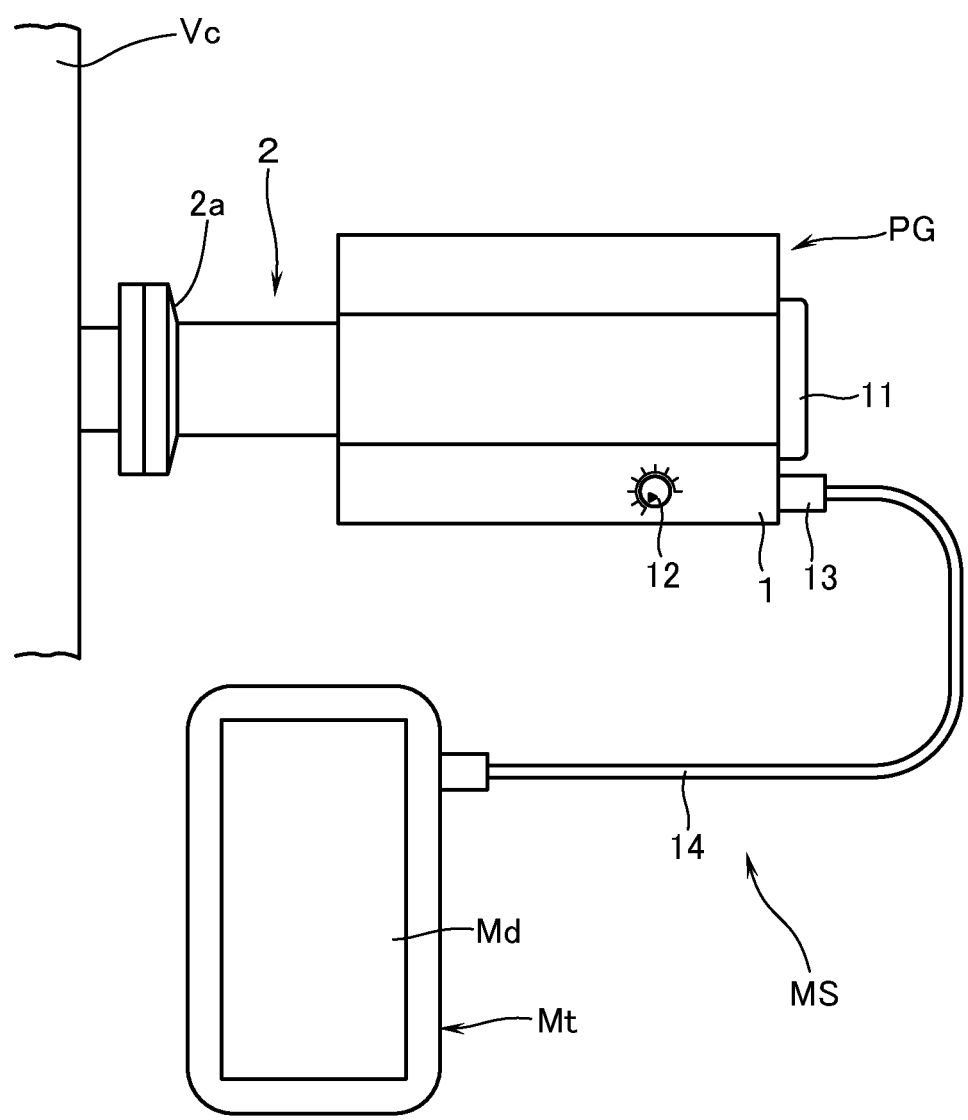
FIG. 1 is an outside view showing the constitution of a pressure measurement system according to this embodiment when the vacuum gauge of this embodiment is made to be a Pirani gauge.
Figure 2A:
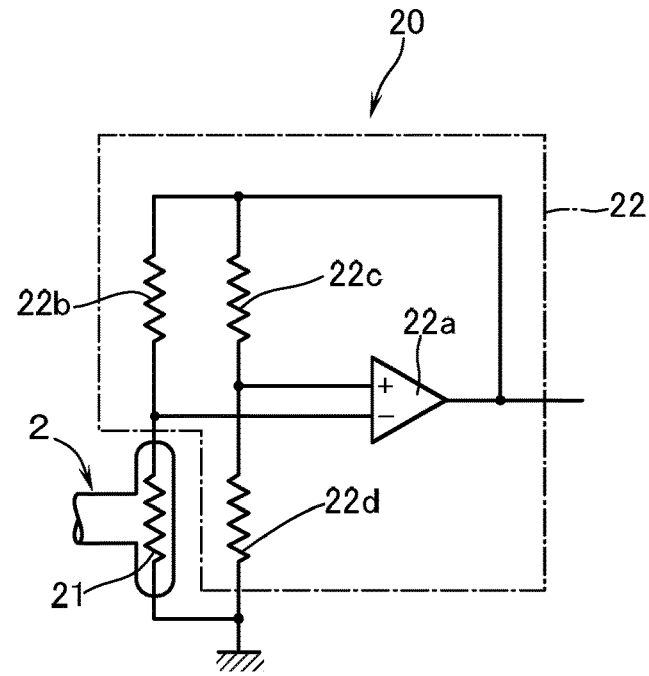
FIG. 2($a$) is a detection circuit diagram of the Pirani gauge in FIG. 1.
Figure 2B:
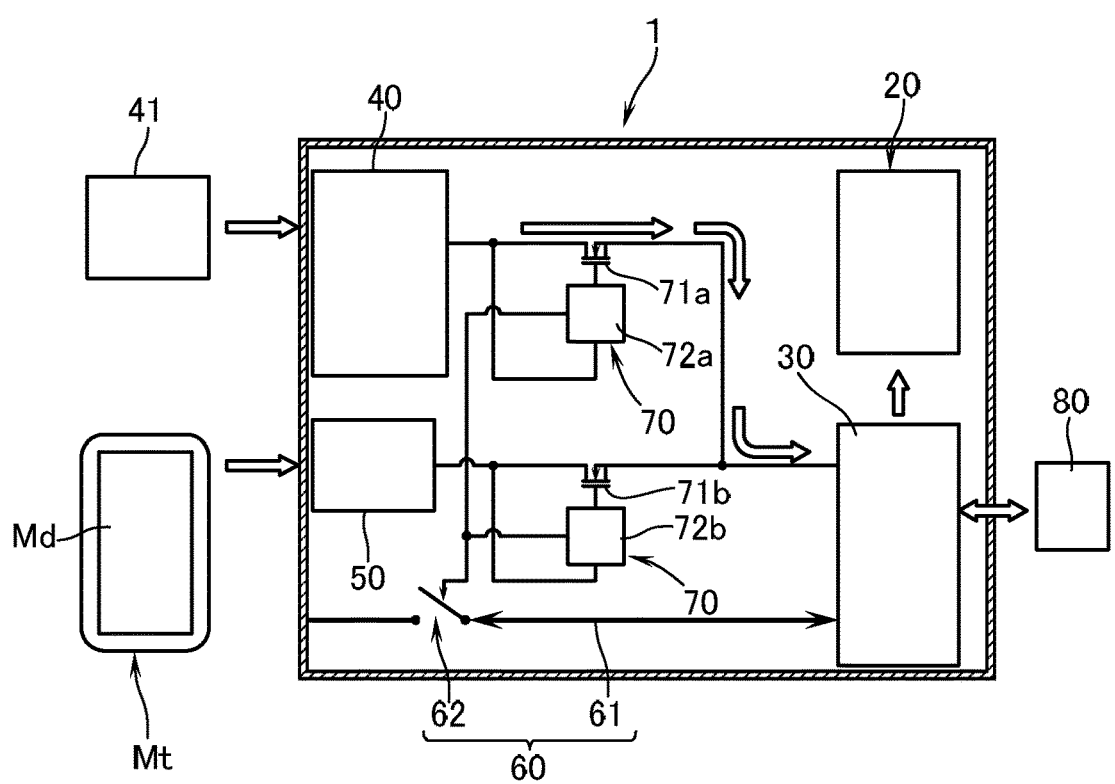

With reference to FIGS. 1, 2($a$) and 2($b$), the Pirani gauge PG is provided with a main body 1 and on one side surface of the main body 1 is disposed a tubular sensor 2 which is a constituting element of the sensor section to be described in detail hereinafter, the tubular sensor 2 having on one side surface a flange 2$a$ which enables to mount the main body 1 on the vacuum chamber Vc. The tubular sensor 2 has a filament 21 made, e.g., of platinum as shown in FIG. 2($a$). On the other hand, inside the main body 1, there are disposed as shown in FIG. 2($b$): a sensor section 20 which is worked by receiving power supply; a control section 30 which supplies the sensor section 20 with power and which is also provided with a microcomputer and a memory for processing the input from the sensor section 20 and for outputting a predetermined signal; and a first power circuit section 40 which receives power supply from a main power source (external power source) 41 and supplies the control section 30 with power. In this case, the opposite side surface of the main body 1 is provided with a connection connector 11 for connecting thereto a power cable (not illustrated) from the main power source 41 as the external power source, and a communication cable (not illustrated) which enables communication with a control unit (not illustrated) of the apparatus main body. By the way, since known ones can be utilized as the control section 30 and the first power circuit section 40, a detailed description thereof is omitted.

The sensor section 20 has, as shown in FIG. 2($a$), a detection circuit 22. The detection circuit 22 is provided with an amplifier (OP amplifier) 22$a$, and three resistors 22$b$-22$d$ which constitute a bridge circuit together with a filament 21 (see FIG. 2($a$)). It is thus so arranged that the control section 30 supplies the filament 21 with voltage (e.g., 5 V) and supplies the amplifier (OP amplifier) 22$a$ with driving voltage (e.g., 15 V). At the time of pressure measurement, when the filament 21 is heated by energization (or excitation) by the control section 30, the voltage is outputted by the detection circuit 22 depending on the pressure inside the vacuum chamber Vc in which the filament 21 is exposed to the pressure within the tubular sensor 2, and the result is inputted into the control section 30. By the way, since the measuring principle in the detection circuit 22 is known, further description is omitted.

Upon receipt of an input from the sensor section 20, the control section 30 processes the input signal, e.g., by A/D (analog to digital) conversion and the like, and outputs a predetermined signal to external devices (not illustrated) such as a control unit of the apparatus main body, a personal computer, a display and the like. Depending on the above activities, the external devices are arranged to display, e.g., the pressure. In addition, the memory of the control section 30 is so arranged that the setting values (set points) to determine the working of the movable parts of the vacuum processing apparatus such as high-vacuum exhaust pump, gas flow amount adjusting valve, gate valve and the like are set in advance, and are stored in memory. As to the setting values (set points), desired values (operation information as will be described hereinafter) are generally written into the control section 30 from the host control apparatus such as control unit of the apparatus main body (not illustrated) through the communication cables and connection connector 11. Depending on the input from the sensor section 20 and the setting values, the control section 30 outputs particular signals to the control unit of the apparatus main body. Alternatively, instead of through the communication cable, there may be provided a potentiometer 12 in the main body 1 as shown in FIG. 1 so that setting values (set points) may be set or changed through the potentiometer 12 relative to the memory of the control section 30.

By the way, the above-mentioned Pirani gauge PG is operated by receiving power supply (e.g., DC 24 V) from the main power source 41. Therefore, in a state in which power supply has not been received at the time of assembling and installation of the vacuum processing apparatus, such activities as setting/changing of the setting values (set points) cannot be done at all to the Pirani gauge PG. Further, even in case the main body 1 is provided with the potentiometer 12 as described above, if the main body 1 has a scale or the like in the neighborhood of the potentiometer 12, it is possible to set the setting values at the accuracy corresponding to the scale, but true values cannot be confirmed. Such being the case, it is desirable for the activities of setting/changing the setting values (set points) to be capable of being performed in parallel with the assembling and installation of the vacuum processing apparatus.

As a solution, the main body 1 is provided inside thereof with the following, i.e., a second power circuit section 50 to supply the control section 30 with power by receiving power supply from the terminal device Mt that can supply independent power from a battery, the terminal device being, e.g., a smart phone, tablet, personal computer and the like owned by the user of the Pirani gauge PG; and a communication circuit section 60 which, in a state in which power is being supplied to the control section 30 through either of the first power circuit section 40 and the second power circuit section 50, connects the control section 30 to the terminal device Mt in a manner to be freely communicated with each other through the communication line. In this embodiment, there is disposed a USB port 13 on the opposite side surface of the main body 1 so that the Pirani gauge PG and the terminal device Mt can be connected together through a USB cable 14.

The second power circuit section 50 is constituted by a so-called step-up/step-down circuit. Power is supplied so that the voltage (e.g., DC 5 V) to be supplied from the terminal device Mt is stepped up or stepped down to the voltage required by the control section 30. By the way, the step-up/step-down circuit may alternatively be the one to simply electrically insulate at the same potential without stepping up or stepping down. Further, from the viewpoint of noise prevention, the step-up/step-down circuit of electrical insulation type is preferable. The communication circuit section 60 is provided with: a communication line 61 which connects the Pirani gauge PG and the terminal device Mt together in a manner to be freely communicated with each other; and a switching element 62 made up of a relay and the like interposed in the communication line 61. At the time of supplying power from one of the first power circuit section 40 and the second power circuit section 50 to the control section 30, the switching element 62 is switched on, thereby connecting the Pirani gauge PG and the terminal device Mt through the communication line 61 in a manner to be freely communicated with each other. By the way, when power is supplied from the first power circuit section 40 to the control section 30, the switching element 62 is switched off so as to shut off the communication with each other, thereby reducing the effect of the noises. In case the effect of the noises can be neglected, the physical switching element 62 is not necessary; the communication circuit section may then be constituted only by the communication line 61 (typically, in case the communication is not by wired communication, the physical switching element 62 becomes needless and is replaced by a logical switch inside the control section 30).

In the above-mentioned arrangement, it is based on presumption that the control section 30 is connected to the terminal device Mt at all times. Alternatively, an exterior type memory 80 may be connected to the control section 30 (e.g., a USB memory is connected to the USB port 13). To this memory 80 the input received from the sensor section 20 is stored in memory, and this stored input may be arranged to be transmitted to the terminal device Mt, e.g., at the time of completion of pressure measurement. In addition, it may further be so arranged that the setting values stored in advance in the memory 80 may be read by the control section 30 (of the same or another vacuum gauge PG). In other words, the same function can be materialized by indirect communication through the memory 80. It is not necessary to prepare the same number of terminal devices Mt as that of the vacuum gauges PG, thereby improving the convenience. Further, in case indirect communication is performed through the memory 80, each information or value (i.e., data) shall preferably be added with a time stamp so that the chronological relationship among each data can be grasped. As the communication line 61, use may be made, aside from the wired communication, of infrared-ray communication, Bluetooth™ which is a short-range radio link technology standard, Wi-Fi, and the like.

Inside the main body 1 there is disposed a switching circuit section 70 for switching the power supply to the control section 30 either through the first power circuit section 40 or through the second power circuit section 50. The switching circuit section 70 has first and second switching elements 71a, 71b and first and second level shift circuits 72a, 72b, made up of switching transistors and the like, respectively connected to the first power circuit section 40 and the second power circuit section 50. It is thus so arranged that, corresponding to the input voltage to the first power circuit section 40 and the second power circuit section 50, the first and second switching elements 71a, 71b are on-off controlled so as to switch over the power supply to the control section 30. According to this arrangement, the vacuum gauge PG can judge the power supply from the terminal device Mt to the control section 30. In concrete, in case power is supplied from both the main power source 41 and the terminal device Mt, making voltage from the main power source 41 and from the terminal device Mt are observed so that, if power supply from the main power source 41 is confirmed to be in a range required for the Pirani gauge PG to work, the control section 30 is supplied with power from the main power source 41. It is so designed that, when power is supplied respectively to the first power circuit section 40 and the second power circuit section 50 (power is being supplied respectively from the main power source 41 and the terminal device Mt), no disadvantageous voltage is applied to the control section 30. In case the power is being supplied only from the terminal device Mt but the rated voltage that is required for the ordinary actuation of the sensor section 20 is not being charged, e.g., in the control section 30, the power is supplied only to the circuit portion that is required for setting/changing of the setting values. According to this arrangement, even in case the power supply is in an unstable state or is not at sufficient voltage, the terminal device Mt makes circuit selection depending on the requirement such as selecting power supply to the power circuit sections 40, 50 in wired or wireless manner, or selecting power supply only to the control section 30. In this manner, while securing the stability in the entire pressure measurement system, it becomes possible to transmit the manipulation information (to be described later), through the communication circuit section 60, to the control section 30.

By the way, the above-mentioned embodiment is based on an example in which the power supply circuit section is made up of the first power circuit section 40 and the second power circuit section 50. But without being limited thereto, an arrangement having a single power supply circuit section can supply power, in a manner similar to the conventional Pirani gauge, only to the above-mentioned control section 30. Although not described by particularly illustrating, this kind of power supply circuit section is ordinarily arranged to confirm the input voltage (from the external power source) by means of its circuit element (IC and the like) and then, if the input voltage lies within a predetermined range, to supply power to the control section and the sensor section. In addition, it may be so arranged that a function to confirm the input voltage from the terminal device Mt which is of lower voltage than the external voltage, is provided with the circuit element (in other words, in case voltage that does not reach the rated voltage required for the normal operation of the sensor section is being applied) and, if the input voltage is within a predetermined range, power may be supplied only to the control section. In this arrangement, it may be so arranged on the side of the terminal device Mt that selection can appropriately be made whether the power is supplied only to the control section or both to the control section and the sensor section, and the selection may be made to be stored in memory.

By the way, in case there is a power supply from the side of the main power source 41, the terminal device Mt may be arranged to be supplied with charging current. By having this kind of function, if the memory 80 and the USB battery, in place of the terminal device Mt, for example, are connected to the USB port 13 after having arranged to constitute a parallel circuit, the actuation of the vacuum gauge PG can be continued even in case the main power source 41 has been lost. At the same time, there can be obtained an effect in that the data can be stored in the memory 80, whereby a simple uninterruptible power supply pressure measurement system can also be established. In case the function of this uninterruptible power supply pressure measurement system is endowed with the vacuum gauge PG, it is further preferable to detect the voltage drop in the power to be supplied at the second power circuit section 50 and then transmit the signal to the control section 30. By making this kind of arrangement, it becomes possible to issue an alarm, to perform finishing processing of the data to be stored in memory, and the like at a stage prior to the loss of power to be supplied.

Figure 3:
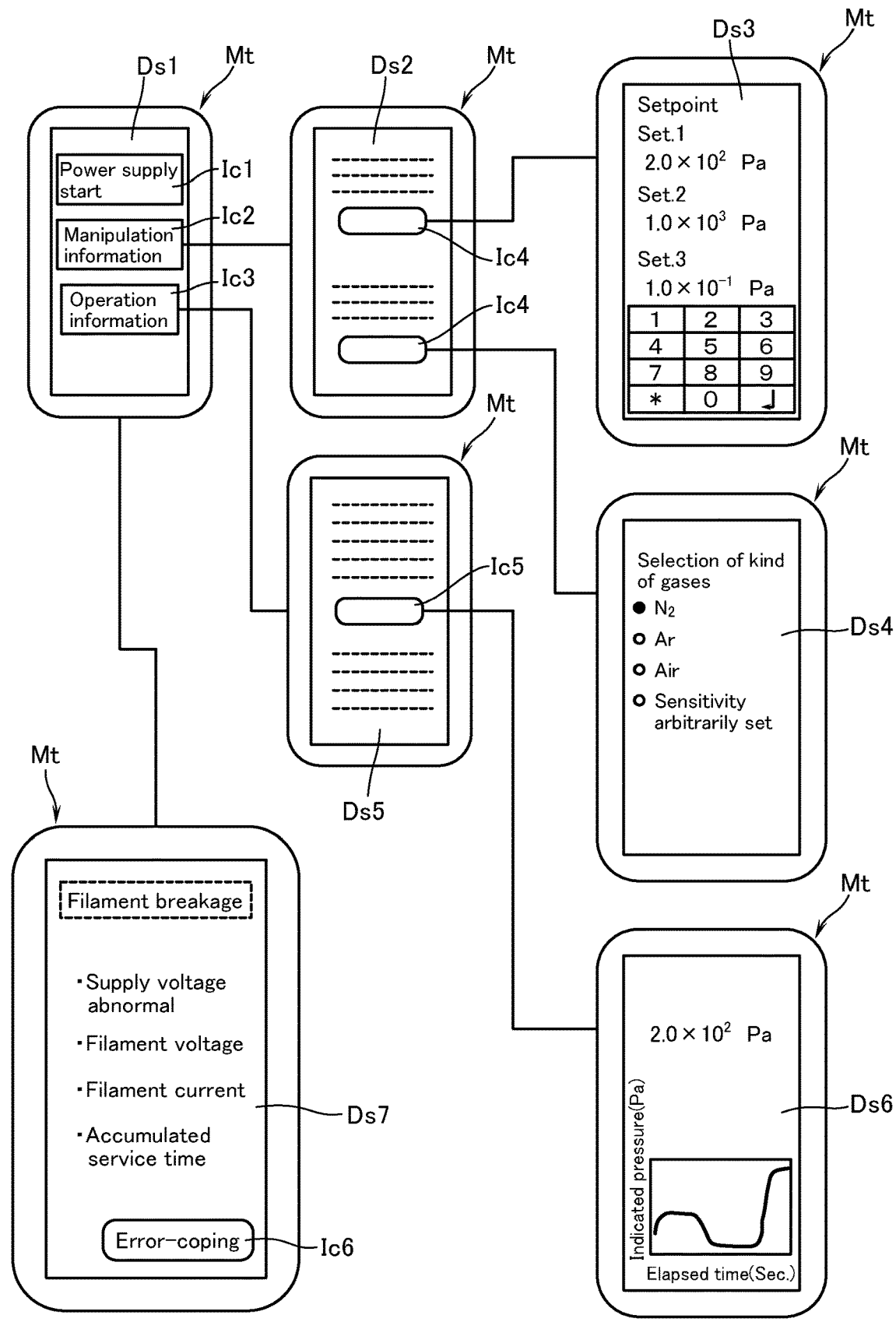
FIG. 3 is a figure explaining the state of manipulation of the terminal devices.

Next, with reference also to FIG. 3, provided that the terminal device Mt is a smartphone, a description will now be made of a pressure measurement system MS including this terminal device Mt and the above-mentioned Pirani gauge PG. The terminal device Mt makes an access, through the Internet network, to an administrative server equipment (Web server, not illustrated) that is conducted by an undertaker. The application software is downloaded, the software being for transmitting the command relating to the working of the Pirani gauge PG, complying with the demand by the user, to the control section 30, the software also being for announcing the operation information of the Pirani gauge PG that is being transmitted from the control section 30. The application software can thus be carried out (installed) on operation software that is operated inside the terminal device Mt. When the user starts up the application software in the terminal device Mt, the initial screen Ds1 will be displayed on a touch panel display Md of the terminal device Mt. In FIG. 3, the reference mark Md for the touch panel display is omitted.

In the initial screen Ds1, each of the icons Ic1, Ic2, Ic3 is displayed, the icons being for the power supply start, for the manipulation information, and for the operation information relating to the Pirani gauge PG, respectively. When the icon Ic1 for the power supply start has been selected on the touch panel display Md in a state in which the Pirani gauge PG and the terminal device Mt are connected together through the USB cable 14, if there is no voltage supply from the main power source 41 in a range required for working of the Pirani gauge PG, the second switching element 71*b* will be switched on by the second level shift circuit 72*b*. The control section 30 is thus supplied, through the second power circuit section 50, with a predetermined voltage (e.g., 5 V) and, as a result of switching-on of the switching element 62, the Pirani gauge PG and the terminal device Mt are connected together through the communication line 61 in a manner to be capable of intercommunication with each other. It may also be so arranged that, when the Pirani gauge PG and the terminal device Mt are connected together through the USB cable 14, the power of a predetermined voltage is automatically supplied from the terminal device Mt to the second power circuit section 50, thereby attaining the state of intercommunication.

Once the icon Ic2 for the manipulation information has been selected, the screen will be transferred to the setting/changing screen Ds2 displaying the setting/changing items which the user wishes to set/change. When one Ic4 of the icons is selected, the manipulation screen corresponding to the icon Ic4 in question will be displayed so that setting/changing becomes possible. Then, after setting and changing, the result will be transmitted to the control section 30 through the communication line 61. According to this arrangement, in case the Pirani gauge PG is mounted on the vacuum chamber Vc to measure the pressure, it becomes possible for the control section 30 to output a specific signal corresponding to the manipulation information that has been transmitted, the input from the sensor section 20, and the setting values. As the manipulation information there can be listed the setting values (set points) to determine the working of the movable parts of the vacuum processing apparatus, measuring sensitivity, kind of gases (nitrogen, oxygen, atmosphere and the like) to be measured and the like. The touch panel display Md of the terminal device Mt will display the manipulation screen Ds3 for the set point as the manipulation screen, and manipulation screen Ds4 for selection of the kind of gases. It is so arranged that what have been set and changed on the manipulation screen of the touch panel display Md will be stored in memory inside the terminal device Mt whenever renewed. Although not explained by particularly illustrating, the following arrangement may also be employed, i.e., within the setting/changing screen Ds2, an icon (not illustrated) for performing the calibration of the Pirani gauge PG, such as atmospheric pressure adjustment, zero adjustment, and the like is displayed. When this icon is selected, the contents will accordingly be transmitted to the control section 30 of the Pirani gauge PG. Prior to the pressure measurement after the Pirani gauge PG has been mounted on the vacuum chamber Vc, the atmospheric pressure adjustment, zero adjustment, and the like may be automatically performed by the control of the control section 30.

On the other hand, once the icon Ic3 for the operation information has been selected, the screen will be transferred to the operation information selection screen Ds5 which displays the operation information items the user wishes to obtain. If one Ic5 of the icons is selected, as a result of input from the control section 30 of the Pirani gauge PG, the obtained information corresponding to this icon Ic5 will be displayed on the touch panel display Md as obtained information screen. In this case, the obtained information may also be outputted in the form of voice by a built-in loudspeaker in the terminal device Mt. These equipments constitute announcing means. As the operation information there may be listed measuring pressure, filament current (and/or voltage) at the sensor section, accumulated service time (estimated available time of the filament), and the like. The touch panel display Md of the terminal device Mt displays the measured pressure screen Ds6 as the obtained information screen. In this case, as to the measured pressure, it may be so arranged that the change in pressure with the lapse of time is displayed in a graphic form, or the pressure at the time of measurement is simultaneously displayed in an analog meter.

Further, when the user has started up the application software in the terminal device Mt and, if the control section 30 judges that some kind of error has occurred in the sensor section 20 in a state in which the Pirani gauge PG and the terminal device Mt are connected through the USB cable 14, the touch panel display Md may display an error item screen Ds7 so as to announce it to the user. As the error items, there may be listed filament breakage, supply voltage abnormality, filament voltage and current abnormality, accumulated service time, and the like. It may be so arranged that the error item screen Ds7 causes to display the error-coping icon Ic6. When this icon Ic6 has been selected, an access is made, e.g., through the Internet network to an administrative server equipment (Web server, not illustrated) that is being conducted by an undertaker so as to obtain information to cope with the errors, or to enable to place an order for replacement parts. A description will hereinafter be made in concrete of the manipulation of the pressure measurement system MS.

Suppose that, after the user has connected the Pirani gauge PG and the terminal device Mt through the USB cable 14 in a state in which power supply (e.g., DC 24 V) has not been received from the main power source 41, the icon Ic1 for power supply start is selected on the initial screen Ds1. Then by virtue of the second level shift circuit 72b, the second switching element 71b is switched on and, consequently, the control section 30 is supplied with a predetermined voltage (e.g., 5 V) through the second power circuit section 50. Also the switching element 62 will be switched on so that the Pirani gauge PG and the terminal device Mt are connected together through the communication line 61 in a manner to be freely communicated with each other. Next in case, e.g., the setting values (set points) are set in the control section 30, the initial screen Ds1 is moved to the setting/changing screen Ds2. By appropriately selecting the icon Ic4 in the setting/changing screen Ds2, the manipulation screen Ds3 for set point is displayed. In this state the touch panel display Md is manipulated to input the setting value (set point) and to select a transmission icon (not illustrated), the setting values are transmitted through the communication line 61 to the control section 30. It is thus possible to set the setting values (set points) without resort to the potentiometer 12. The setting values (set points) at this time are stored in memory in the memory of the control section 30 and in the memory of the terminal device Mt, respectively. In case the memory 80 is connected in place of the terminal device Mt, the data to be transmitted and received through the communication line 61 are temporarily stored (stored as a temporary file) in the memory 80 in a file format and the like. The control section 30 and the terminal device Mt materialize the similar situation of free communication with one another by reading-writing the temporary file.

Next, in case the user obtains the operation information from the Pirani gauge PG after having started the operation of the vacuum processing apparatus (a state in which the power has been supplied from the main power source 41), the Pirani gauge PG and the terminal device Mt are connected together through the USB cable 14. Then, the first switching element 71a will be switched on and, as long as judgment is made that voltage in a range required for the Pirani gauge PG to work has not been supplied by the switching circuit section 70 from the main power source 41, the power supply at a predetermined voltage will be continued to the control section 30 of the Pirani gauge PG through the first power circuit section 40. Also the switching element 62 will be switched on so that the Pirani gauge PG and the terminal device Mt are connected together through the communication line in a manner to be freely communicated with each other. Then, in case the measured pressure shall be displayed, for example, screen will be moved from the initial screen Ds1 to the operation information selection screen Ds5 so that the measured pressure screen Ds6 as the obtained information screen will be displayed. In this case, it is also possible to announce the measured pressure by other announcing means such as by a loudspeaker.

According to the above-mentioned embodiment, by providing the main body of the Pirani gauge PG with, e.g., a USB port 13 so as to connect the Pirani gauge PG and the terminal device Mt together through the USB cable 14, it becomes possible to supply at least the control section 30 with power from a terminal device Mt other than the external power source (main power source 41). Also, the control section 30 is connected through the communication line 61 to the terminal device Mt in a manner to be freely communicated with each other. Therefore, without waiting for the power supply (e.g., DC 24 V) from the main power source 41 as the external power source, the power at a predetermined voltage can be supplied from the terminal device Mt. There can thus be performed the activities of setting/changing of the setting values (set points), measuring sensitivity, and the kind of gases (nitrogen, oxygen, atmosphere and the like) to be measured, and the like by manipulating from the side of terminal device Mt. According to this arrangement, contribution of shortening of the start-up time of the vacuum processing apparatus can advantageously be made. As a matter of course, it is desirable to enable to perform the work of setting/changing and the like of the control units, and the like of the apparatus main body 1, as the conventional function, simultaneously in parallel with one another from the host control apparatus through the connection connector 11. In this case, on the side of the terminal device Mt, the work of confirmation of the values as the operation information as transmitted from the host control apparatus will be the main function. As a consequence, the verification of the pressure measurement system MS including the host control apparatus can be facilitated.

Further, once the power supply from the main power source 41 has been received, the output changes in the sensor section 20 are transmitted, as the operation information, to the terminal device Mt. While displaying such operation information or speech-outputting by means of the touch panel display Md or the loudspeaker in the terminal device Mt, such activities as setting/changing of the setting values (set points) with, e.g., manipulation screen Ds3 for set point can be performed. Therefore, the activities can advantageously be simplified. In addition, the setting values (set points) once set remain stored in memory in the terminal device Mt. Therefore, when the existing setting values must be transferred to the new Pirani gauge PG after having replaced it due to a mechanical trouble with the existing Pirani gauge, resetting of the setting values (set points) can be done only by connecting the terminal device Mt and the Pirani gauge PG in a manner to be freely communicated with each other, and then by transmitting the setting values that have been stored in memory in the terminal device Mt. In this arrangement, the occurrence of human errors can be kept to the minimum.

Further, by transmitting, to the terminal device Mt, the operation information such as the pressure in the vacuum chamber Vc (vacuum degree) corresponding to the output of the sensor section 20, the service (or used) time of the sensor section 20, the remaining lifetime of the filament, and the like to the terminal device Mt, and by announcing this operation information by the announcing means, displays for instructing, e.g., the pressure value need not be disposed on the vacuum gauge main bodies or their controllers, thereby bringing about the reduction in cost. By the way, in the conventional Pirani gauges PG, the sensor sections 20 (gauge heads) used to be taken out of position of the gauge main bodies 1 to inspect and judge whether it is out of order or not. However, according to the above-mentioned arrangement, since e.g., filament currents (or voltages) or indicating pressures, for example, can be obtained as the operation information. Therefore, by comparing such operation information with the information empirically obtained in advance, judgment can easily be made as to whether the sensor section 20 is out of order or not. In addition, if an exterior type memory 80 is used in place of the terminal device Mt, in case it is necessary to simultaneously obtain information on a large number of Pirani gauges PG, it is sufficient if the same number of memories 80 as the Pirani gauges are prepared. As compared with the case in which the same number of terminal devices Mt must be prepared, a simpler pressure measurement system can be made. Further, the memory 80 is located external to the main body 1. Therefore, as compared with the measurement system having a memory inside thereof, it is sufficient to prepare a memory 80 depending on the necessity of obtaining the information (i.e., from the case in which the information is not necessary to the case in which a large amount of memory is required). It thus becomes possible to make a pressure measurement system depending on the degree of requirement.

A description has so far been made of the embodiment of this invention, but this invention shall not be limited to the above embodiment. As long as the essence of this invention is not deviated, various modifications are conceivable. In the above-mentioned embodiment, a description has been made of an example of a Pirani gauge PG, but this invention shall not be limited to the above. As long as the vacuum gauge has a sensor section or a control section to be worked by receiving power supply, this invention may apply. As this kind of vacuum gauge, there can be listed an ionization gauge, Penning gauge, thermocouple gauge, capacitance manometer, cold cathode ionization vacuum gauge, quartz friction vacuum gauge, and diaphragm vacuum gauge. In addition, this invention is also applicable to a mass spectrometer.

Further, in the above-mentioned embodiment, a description has been made of an example in which are connected together a Pirani gauge PG and a terminal device Mt to be utilized in a vacuum processing apparatus that can receive power supply. However, in case of a vacuum gauge of relatively smaller power consumption such as thermocouple gauge, capacitance manometer, quartz friction vacuum gauge, and the like, the above-mentioned pressure measurement system can be used in materializing a portable type vacuum gauge by working the vacuum gauge by the power supply from the terminal device Mt. According to this arrangement, at the time of evacuating the pipes for air conditioners and refrigerating system, or in the periodical inspection of a liquefied gas lorry, and the like, by connecting to one another the above-mentioned various information, the data can be obtained and kept in store as an evidence of having performed an inspection.

EXPLANATION OF REFERENCE CHARACTERS

MS pressure measurement system
PG Pirani gauge (vacuum gauge)
Mt terminal device
Vc vacuum chamber (object to be measured)
1 main body
20 sensor section
22 detection circuit (sensor section)
30 control section
40 first power circuit section
41 main power source (external power source)
50 second power circuit section
60 communication circuit section
61 communication line

What is claimed is:
1. A pressure measurement system comprising:
a vacuum gauge including, inside a main body to be mounted on an object to be measured: a sensor section worked by receiving power supply; a control section controlling the working of the sensor section and also processing an input from the sensor section and outputting a predetermined signal; and a power circuit section supplying the control section and the sensor section with power; and
a terminal device connectable to the control section through a communication line in a manner to be freely communicated with the control section, and also con- figured to supply the power circuit section with power in one of a wired manner and a wireless manner, the vacuum gauge being arranged: to judge the power supply from the terminal device to the control section; when power is supplied from the terminal device to the control section, to connect the control section of the vacuum gauge and the terminal device through the communication line in a manner to be freely communicated with each other.

2. The pressure measurement system according to claim 1, wherein the terminal device supplies the power circuit section with power in one of a wired manner and a wireless manner even in a state in which power supply from an outside is not being received so that manipulation information can be transmitted through the communication line to the control section of the vacuum gauge and, at a time of pressure measurement when mounted on the object to be measured, the control section outputs a specific signal depending on the transmitted manipulation information, the input from the sensor section, and setting values.

3. The pressure measurement system according to claim 2, wherein the terminal device is configured to store in memory the manipulation information as transmitted to the control section of the vacuum gauge, and this stored manipulation information is capable of being transmitted to the control sections of other vacuum gauges.

4. The pressure measurement system according to claim 2, wherein the manipulation information includes one for performing atmospheric pressure adjustment and zero adjustment and, when the vacuum gauge has received the transmission of the manipulation information to perform the atmospheric pressure adjustment and zero adjustment, atmospheric pressure adjustment and zero adjustment are performed prior to the pressure measurement upon mounting of the vacuum gauge on the object to be measured.

5. The pressure measurement system according to claim 1, wherein the control section is capable of connection of an external memory, and the external memory is configured to store the manipulation information as stored in the control section.

6. The pressure measurement system according to claim 1, wherein the terminal device comprises announcing means announcing the operation information, upon receipt from the control section of the vacuum gauge of the operation information of the vacuum gauge in a state in which the terminal device and the vacuum gauge are communicated with each other.

7. The pressure measurement system according to claim 6, wherein the operation information includes a value transmitted from a host control apparatus.

* * * * *